United States Patent
Oh et al.

(10) Patent No.: US 8,198,769 B2
(45) Date of Patent: Jun. 12, 2012

(54) HORIZONTAL LINEAR VIBRATOR

(75) Inventors: Hwa Young Oh, Seoul (KR); Jun Kun Choi, Gyunggi-do (KR); Yong Jin Kim, Gyunggi-do (KR); Kyung Ho Lee, Gyunggi-do (KR); Seok Jun Park, Gyunggi-do (KR); Je Hyun Bang, Gyunggi-do (KR); Kwang Hyung Lee, Gyunggi-do (KR); Ki Suk Woo, Seoul (KR); Seung Heon Han, Seoul (KR); Jae Woo Jun, Gyunggi-do (KR)

(73) Assignee: Samsung Electro-Mechanics, Co., Ltd., Suwon, Gyunggi-Do (KR)

( * ) Notice: Subject to any disclaimer, the term of this patent is extended or adjusted under 35 U.S.C. 154(b) by 420 days.

(21) Appl. No.: 12/581,128

(22) Filed: Oct. 17, 2009

(65) Prior Publication Data

US 2011/0012441 A1 Jan. 20, 2011

(30) Foreign Application Priority Data

Jul. 17, 2009 (KR) .................. 10-2009-0065402
Sep. 14, 2009 (KR) .................. 10-2009-0086339

(51) Int. Cl.
*H02K 35/00* (2006.01)
(52) U.S. Cl. ............................ 310/81; 310/15
(58) Field of Classification Search .......... 310/81, 310/15, 20, 25, 36, 37
See application file for complete search history.

(56) References Cited

U.S. PATENT DOCUMENTS

| | | | | |
|---|---|---|---|---|
| 4,127,835 A * | 11/1978 | Knutson | ............. | 335/266 |
| 4,169,234 A * | 9/1979 | Yonkers | ............. | 310/29 |
| 5,736,797 A * | 4/1998 | Motohashi et al. | ............. | 310/36 |
| 5,921,134 A * | 7/1999 | Shiba et al. | ............. | 74/110 |
| 6,326,706 B1 * | 12/2001 | Zhang | ............. | 310/12.31 |
| 6,774,588 B2 * | 8/2004 | Ibuki et al. | ............. | 318/119 |
| 7,288,863 B2 * | 10/2007 | Kraus | ............. | 310/37 |

(Continued)

FOREIGN PATENT DOCUMENTS

EP 1 309 073 A2 5/2003

(Continued)

OTHER PUBLICATIONS

"European Examination Report", Application No. GB0917675.1, Search and Examination Report mailed Feb. 8, 2010., 2 pages.

(Continued)

*Primary Examiner* — Dang Le
(74) *Attorney, Agent, or Firm* — Blakely Sokoloff Taylor & Zafman LLP (57) ABSTRACT

The present invention provides a horizontal linear vibrator which can increase vibration strength while at the same time guaranteeing a sufficiently long lifetime and satisfactory responsivity. The horizontal linear vibrator includes a casing, a bracket, a vibration unit and springs. The bracket and the casing form the internal space therein. A coil is provided above the bracket such that the center axis thereof is oriented in a horizontal direction. The vibration unit is disposed through the coil and comprises a magnetic field generating unit and a weight. The magnetic field generating unit includes a magnet assembly and a yoke. The magnet assembly has magnets which are provided on opposite sides of a magnetic body core such that the similar magnetic poles of the magnets face each other. The weight is mounted to the magnetic field generating unit. The springs are coupled to the casing or the bracket and elastically support the vibration unit.

13 Claims, 9 Drawing Sheets

U.S. PATENT DOCUMENTS 7,999,421 B2 * 8/2011 Kim et al. .................. 310/15
8,097,988 B2 * 1/2012 Kim et al. .................. 310/15

FOREIGN PATENT DOCUMENTS

| JP | 08-116658 | 5/1996 |
| JP | 2003211088 | 7/2003 |
| JP | 2004073983 | 3/2004 |
| KR | 1020070103174 A | 10/2007 |
| KR | 1020080107506 A | 12/2008 |

OTHER PUBLICATIONS

Office Action from counterpart Korean Patent Application No. 10-2009-0086339, Jan. 17, 2011, 5 pages.

* cited by examiner

FIG.1

Prior art

HORIZONTAL LINEAR VIBRATOR

CROSS REFERENCE TO RELATED APPLICATION

This application claims the benefit of Korean Patent Application No. 10-2009-0065402, filed Jul. 17, 2009, entitled "HORIZONTAL LINEAR VIBRATOR", and Korean Patent Application No. 10-2009-0086339, filed Sep. 14, 2009, entitled "HORIZONTAL LINEAR VIBRATOR", which are hereby incorporated by references in its entirety into this application.

BACKGROUND OF THE INVENTION

1. Technical Field

The present invention relates to a horizontal linear vibrator.

2. Description of the Related Art

Generally, portable electronic devices, such as mobile phones, game players, mobile information terminals, etc., have various vibration generating units to prevent noise therefrom from disturbing other people. Particularly, such a vibration generating unit is installed in a cellular phone and used as a mute signal reception indicating unit. Recently, in accordance with the trend to provide a small and slim cellular phone, a reduction in the size and an increase in the function of a vibration generating unit installed in the cellular phone are also required.

At present, a vibration generating unit which is one of several signal reception indicating units used in a communication device, such as a cellular phone, converts electric energy into mechanical vibration by the use of a principle of generating electromagnetic force. That is, the vibration generating unit is used as a mute signal reception indicating unit in the cellular phone.

Meanwhile, a method in which mechanical vibration is generated by rotating a rotor having an eccentric weight has been used as a representative example of methods of operating vibration generating units according to conventional techniques. The rotation of the rotor is implemented by a commutator or brush motor structure which commutates currents through a contact point between the brush and the commutator and then supplies the currents to a coil of the rotor.

However, in the vibration generating unit having this structure, when the brush to passes through a gap between segments of the commutator, mechanical friction, electric sparks or abrasion is induced, thus creating impurities, such as black powder, thereby reducing the lifetime of the vibration generating unit. To overcome these problems, a linear vibrator which can produce reliable linear vibration was proposed.

Figure 1:
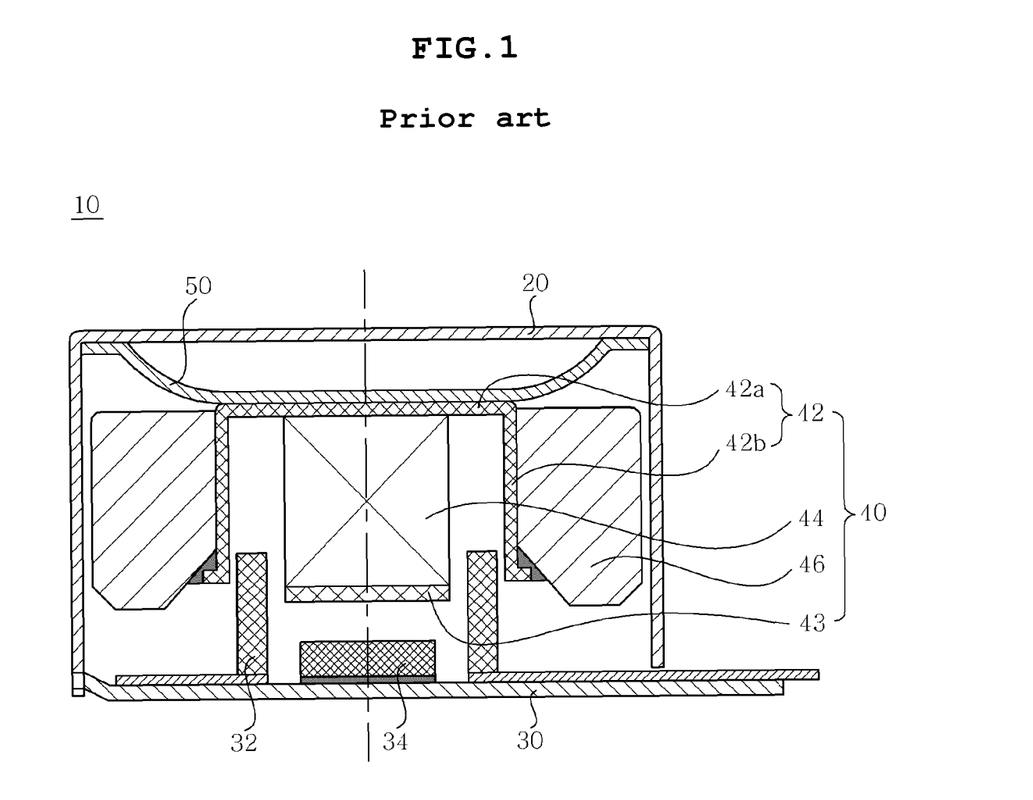
FIG. 1 is a sectional view showing a linear vibrator, according to a prior art.

FIG. 1 is a sectional view of a vertical linear vibrator according to a conventional art.

As shown in FIG. 1, the vertical linear vibrator 10 according to the conventional art includes a casing 20, a bracket 30, a vibration unit 40 and a spring 50. The casing 20 defines a space therein. The bracket 30 supports thereon a coil 32 which forms a magnetic field using an electric current applied to the coil 32. A damper 34 is provided on the bracket 30. The vibration unit 40 includes a yoke 42 which has a hollow space therein and is closed on one end thereof, a magnet 44 which is installed in the hollow space of the yoke 42 and provided with a plate yoke 43 attached to the lower surface thereof, and a weight 46 which is fitted over the circumferential surface of the yoke 42. The spring 50 is coupled to the upper surface of the casing 20 to elastically support the vibration unit 40 such that it linearly vibrates. The yoke 42 includes a disk part 42a and a rim part 42b which is bent downwards from the outer edge of the disk part 42a and extends a predetermined length.

In the vertical linear vibrator 10 having the above-mentioned construction, when power is applied to the coil 32, the vibration unit 40 vibrates upwards and downwards by the spring 50 due to interaction between a magnetic field which is generated by a magnetic circuit including the cylindrical magnet 44, the plate yoke 43 and the yoke 42, and an electric field generated by the coil 32.

However, in the vertical linear vibrator 10, because the vibration quantity is proportional to a value obtained by multiplying the weight of the vibration unit 40 by a displacement thereof, the weight or displacement of the vibration unit 40 must be increased to ensure sufficient vibration quantity. This induces a disadvantage of the vertical linear vibrator 10 being increased in thickness. Furthermore, this structure cannot conform to the trend of small and slim cellular phones.

SUMMARY OF THE INVENTION

The present invention has been made in an effort to provide a horizontal linear vibrator which can increase vibration strength while at the same time guaranteeing a sufficiently long lifetime and satisfactory responsivity.

The present invention has been made in an effort to provide a horizontal linear vibrator which includes a magnetic field generating unit that can increase electromagnetic driving force.

In a horizontal linear vibrator according to an embodiment of the present invention, a casing is provided. A bracket is assembled with the casing to form an internal space in the casing and the bracket. A coil is provided above the bracket such that a center axis of the coil is oriented in a horizontal vibration direction. A vibration unit is disposed through the coil. The vibration unit includes a magnetic field generating unit having a magnet assembly and a yoke. The magnet assembly has a magnetic body core and magnets provided on opposite sides of the magnetic body core such that like poles of the magnets face each other. The yoke surrounds sidewalls of the magnets and the coil. The vibration unit further includes a weight mounted to the magnetic field generating unit. A spring is coupled to a sidewall of the casing or the bracket. The spring elastically supports the vibration unit to allow the vibration unit to vibrate in the horizontal direction.

Furthermore, a damper may be provided on the sidewall of the casing or the bracket to prevent the vibration unit from coming into direct contact with the casing or the bracket.

In addition, a circuit board may be installed on the bracket. The circuit board may be connected to an external input terminal.

As well, a bobbin is provided on the bracket. The bobbin may be inserted into the coil.

The bobbin may include a vertical plate perpendicularly provided on the bracket; and a horizontal extension part extending a predetermined length from the vertical plate in the horizontal vibration direction.

A magnetic fluid may be applied to an outer surface of the magnet assembly.

The yoke may be open on upper and lower ends thereof.

The yoke may include an upper plate having an opening therein, the upper plate having a rectangular shape, and longitudinal side plates and lateral side plates bent from the upper plate downwards and extending predetermined lengths.

Furthermore, a spring support may be provided on an outer surface of the lateral side plates of the yoke, so that the spring is supported by the spring support.

The lateral side plates of the yoke may have a bent depressed portion therein, so that an end of the corresponding magnet is inserted into and supported by the bent depressed portion.

The lateral side plates of the yoke may have a notch therein, so that an end of the corresponding magnet is inserted into the notch.

The spring may comprise a coil spring or a plate spring.

The spring may comprise a plurality of springs provided on opposite sides of the vibration unit.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components. In the following description, when it is determined that the detailed description of the conventional function and conventional structure would confuse the gist of the present invention, such a description may be omitted. Furthermore, the terms and words used in the specification and claims are not necessarily limited to typical or dictionary meanings, but must be understood to indicate concepts selected by the inventor as the best method of illustrating the present invention, and must be interpreted as having meanings and concepts adapted to the scope and sprit of the present invention for understanding the technology of the present invention.

Hereinafter, embodiments of the present invention will be described in detail with reference to the attached drawings.

Figure 2:
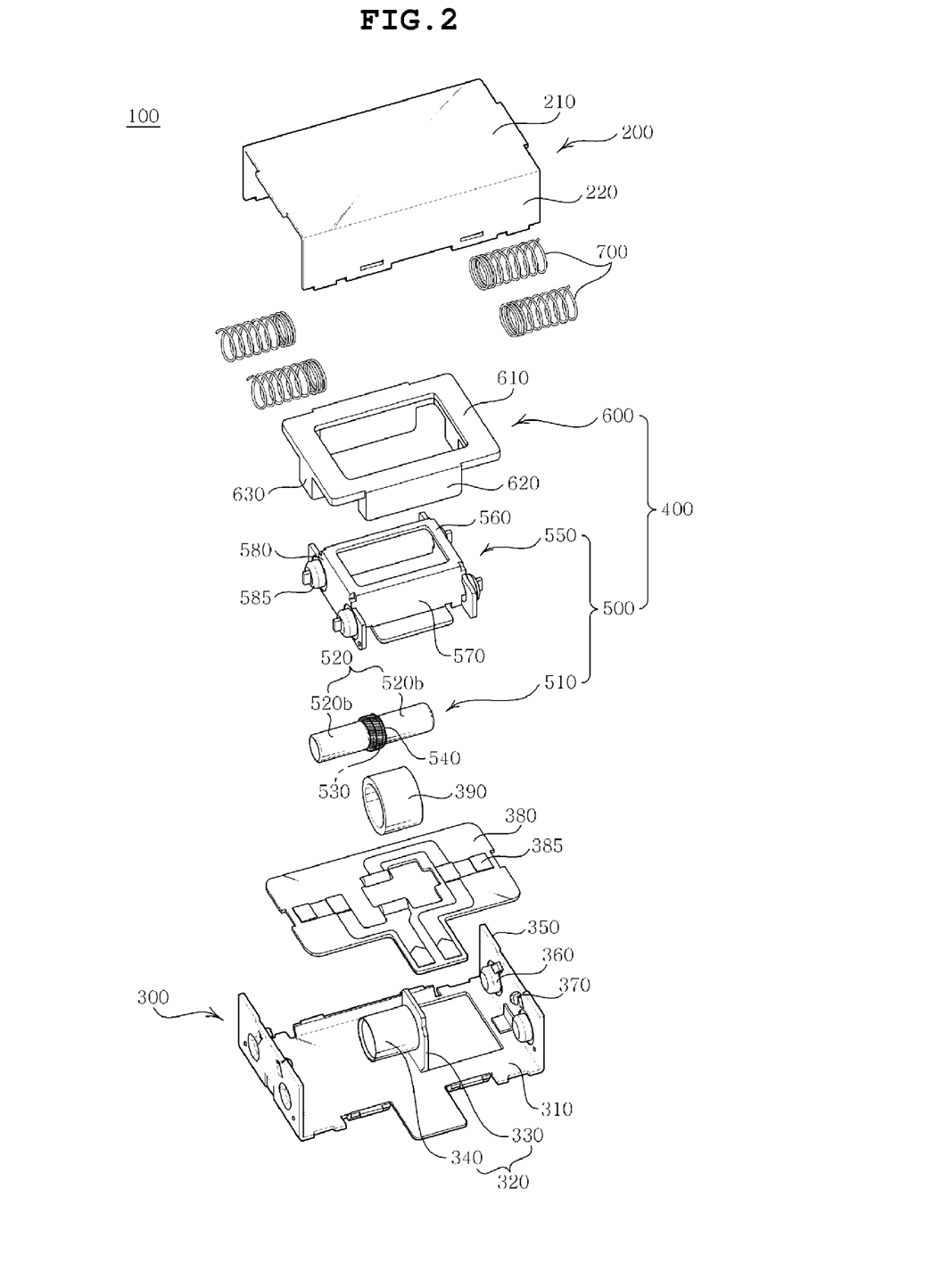
FIG. 2 is an exploded perspective view of a horizontal linear vibrator, according to an embodiment of the present invention.

FIG. 2 is an exploded perspective view of a horizontal linear vibrator 100, according to an embodiment of the present invention. FIGS. 3 through 6 are perspective views of the assembled horizontal linear vibrator 100 of FIG. 2. The horizontal linear vibrator 100 according to this embodiment will be described in detail with reference to these drawings.

As shown in FIGS. 2 through 6, the horizontal linear vibrator 100 according to this embodiment of the present invention includes a casing 200, a bracket 300, a vibration unit 400 and springs 700.

The casing 200 protects the horizontal linear vibrator from the outside and provides space for the displacement of the vibration unit 400 to vibrate in the horizontal direction. That is, the casing 200 is a member providing internal space for the horizontal linear vibrator 100. In detail, the internal space is defined by assembling the casing 200 with the bracket 300.

The casing 200 may have any structure, so long as it forms an internal space when it is assembled with the bracket 300. Preferably, the casing 200 has a rectangular structure whose longitudinal length (the direction in which the vibration unit 400 horizontally vibrates) is longer than that in the lateral direction, so that the horizontal displacement space of the vibration unit 400 can be sufficiently guaranteed.

In this embodiment, the casing 200 includes an upper plate 210 and longitudinal side plates 220 which are bent perpendicularly down from both edges of the upper plate 210. The lower surface and both lateral sides of the casing 200 are open.

The bracket 300 is coupled to the casing 200 to define the internal space. Furthermore, the bracket 300 provides space for mounting a bobbin 320 and a circuit board 380.

Figure 6:
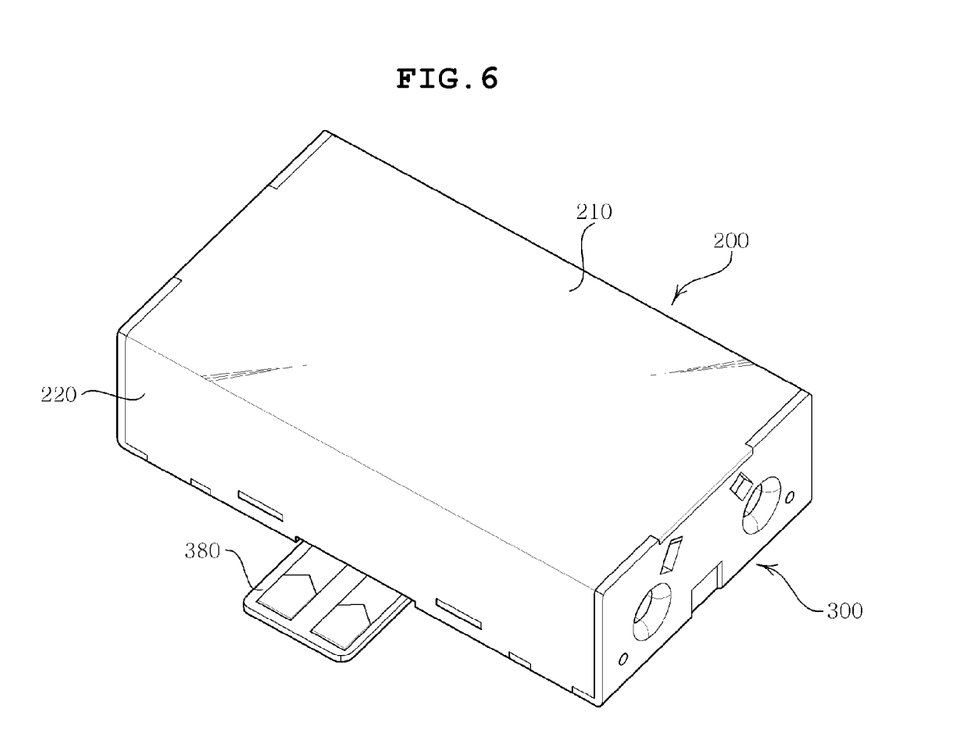

The bracket 300 is configured such that the upper surface and both longitudinal sides thereof are open to correspond to the structure of the casing 200. In other words, the bracket 300 includes a bottom plate 310 and lateral side plates 350 and is coupled to the casing 200, thus forming the internal space. However, the configuration of the casing 200 and the bracket 300 shown in FIGS. 2 and 6 is only one example of the structure in which the casing 200 may be assembled with the bracket 300 to form the internal space in which the vibration unit 400 vibrates in the horizontal direction. For example, alternatively, the casing 200 and the bracket 300 may be configured such that the casing 200 has the shape of a rectangular parallelepiped which is open on the lower surface thereof while the bracket 300 has a planar shape to form the bottom plate. In this case, the internal space can also be defined by assembling the casing 200 and the bracket 300 with each other. As well, those skilled in this art will easily understand that the configuration of the casing 200 and the bracket 300 can be variously modified.

The bobbin 320 over which a coil 390 is fitted is provided on the bottom plate 310 of the bracket 300. The circuit board 380 is mounted to the bottom plate 310 of the bracket 300.

The bobbin 320 has a hollow shape such that the coil 390 is fitted over the circumferential outer surface thereof and a magnet 520 can reciprocate through the bobbin 320. In this embodiment, the bobbin 320 includes a vertical support plate 330 which is perpendicularly provided on the central portion of the upper surface of the bottom plate 310 and is parallel to the lateral side plates 350, and a horizontal extension part 340 which extends a predetermined length from the vertical support plate 330 in the longitudinal direction of the bracket 300, that is, in the direction in which the vibration unit 400 horizontally vibrates. The vertical support plate 330 and the horizontal extension part 340 have therein a hollow space within which a magnet assembly 510 reciprocates. In FIG. 2, although the horizontal extension part 340 has been illustrated as extending from only one side of the vertical support plate 330, the horizontal extension part 340 may extend from both sides of the vertical support plate 330. This can also fall within the bounds of the present invention.

Meanwhile, the coil 390 generates an electric field when external power is applied thereto. The coil 390 is fitted over the circumferential outer surface of the horizontal extension part 340 of the bobbin 320 (refer to FIG. 3). Because the center axis of the horizontal extension part 340 of the bobbin 320 is oriented in the same direction as the direction in which the vibration unit 400 horizontally vibrates, the center axis of the coil 390 that is fitted over the circumferential outer surface of the horizontal extension part 340 is also oriented in the same direction as the direction in which the vibration unit 400 horizontally vibrates. Here, a coil wire of the coil 390 is connected to a pattern 385 of the circuit board 380 by soldering, so that external power can be applied to the coil 390 through the circuit board 380. Although the coil 390 has a hollow cylindrical shape, a shape of coil 390 can be variously modified.

Furthermore, the circuit board 380 is connected to an external input terminal and thus functions to transmit external power to the coil 390. The circuit board 380 has the pattern 385 and has therein an opening through which the bobbin 320 is disposed. In FIG. 2, although the circuit board 380 has been illustrated as being provided separately from the bracket 300, they may be integrally formed into a single body using the same material.

Each lateral side plate 350 of the bracket 300 has on the inner surface thereof first supports 360 which are inserted into the corresponding springs 700 to support the springs 700, and catches 370 which hold ends of the corresponding springs 700. Although the first supports 360 and the catches 370 have been illustrated as having the configuration of FIG. 2 to correspond to the shapes of coil springs that are used as the springs 700 of this embodiment, this is only one example for the illustrative purpose. For example, in the case where plate springs are used as the springs 700, it will be appreciated that the structure for fastening the springs 700 to the lateral side plates 350 can be modified in a shape appropriate to hold and support the plate spring. In other words, the structure for fastening the springs 700 to the lateral side plates 350 can be variously modified rather than being limited to the structure of FIG. 2.

Furthermore, a damper (not shown) is preferably provided on the inner surface of the bracket 300 to absorb shock applied to the vibration unit 400 and prevent the vibration unit 400 from coming into direct contact with the bracket 300 when the vibration unit 400 horizontally vibrates. A variety of materials which are capable of absorbing shocks, such as rubber, polypropylene, magnetic fluid, etc., can be used as the material used for the damper.

The vibration unit 400 which linearly vibrates in the horizontal direction includes a magnetic field generating unit 500 and a weight 600.

Figure 3:
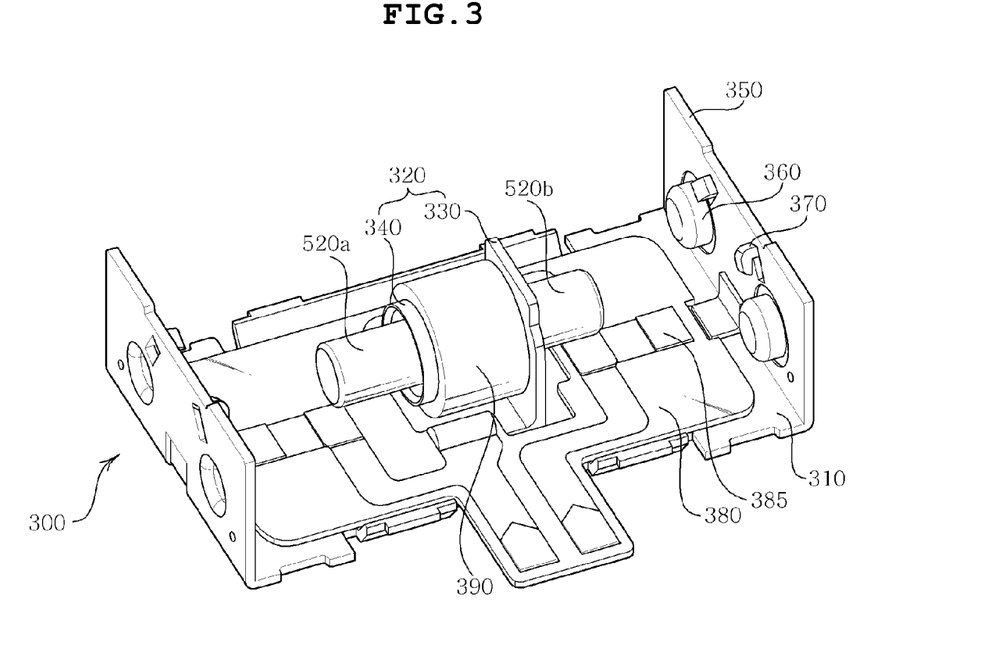
FIGS. 3 through 6 are perspective views of the assembled horizontal linear vibrator of FIG. 2.
Figure 4:
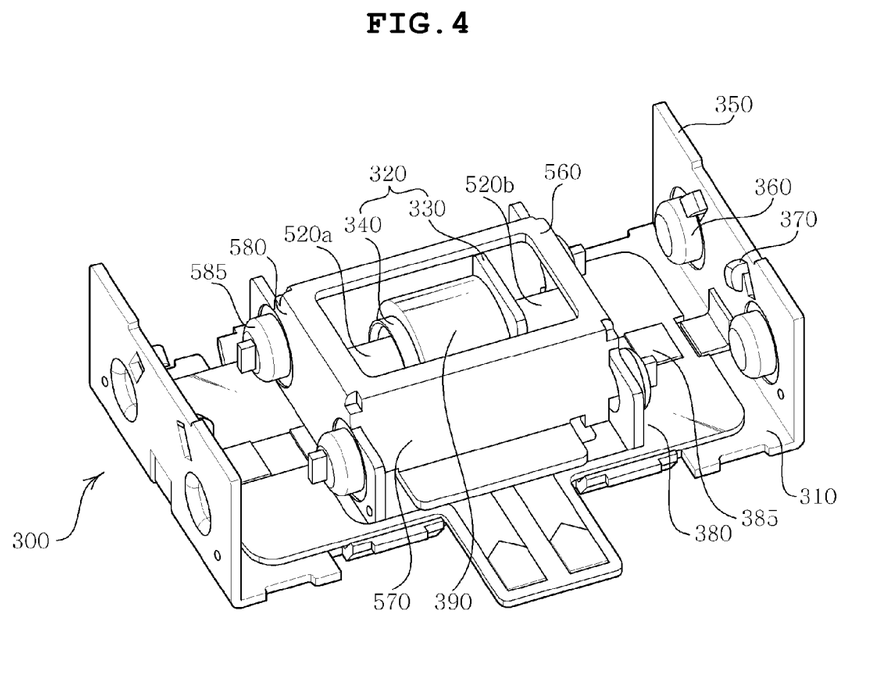
Figure 5:
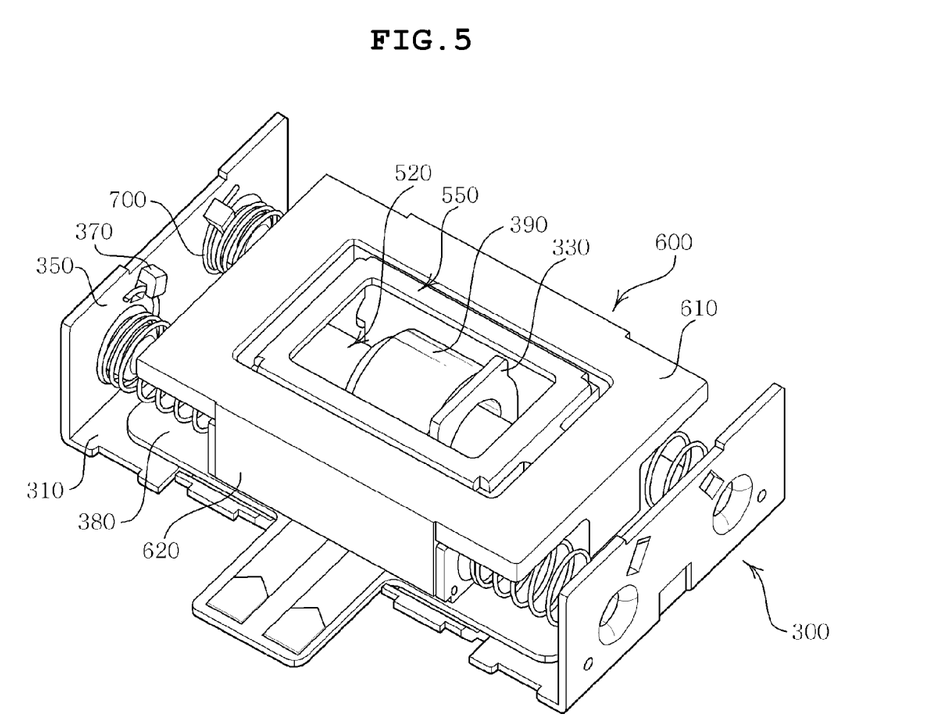

The magnetic field generating unit 500 generates electromagnetic force to horizontally vibrate the vibration unit 400 and includes the magnet assembly 510 and a yoke 550. FIGS. 3 and 4 are perspective views illustrating the magnetic field generating unit 500 assembled with the bracket 300.

The magnet assembly 510 generates a magnetic field of a predetermined magnitude such that the vibration unit 400 can linearly vibrate using reciprocal action between the magnetic field and the coil 390. The magnet assembly 510 is constructed such that first and second magnets 520 are attached to both sides of a magnetic body core 530. Here, the first magnet 520*a* that is attached to a first side of the magnetic body core 530 and the second magnet 520*b* that is attached to a second side of the magnetic body core 530 are oriented such that their similar poles face each other.

Preferably, the magnetic fluid 540 is applied to the circumferential outer surface of the magnet assembly 510 to prevent the magnet assembly 510 from coming into direct contact with the inner surface of the horizontal extension part 340 of the bobbin 320 when the vibration unit 400 horizontally vibrates. The magnetic fluid 540 is arranged around the circumferential outer surface of the magnet assembly 510 in a cylindrical shape by leakage flux of the magnets 520.

Here, the magnetic fluid 540 is formed in such a way that magnetic powder is stably and evenly dispersed in liquid to have a colloidal shape and a surface active agent is added to the liquid to prevent deposition or agglutination of the magnetic powder attributable to gravity or the magnetic field. For example, magnetic fluid formed by dispersing triiron tetroxide or iron-cobalt alloy particles in oil or water is used, and, recently, magnetic fluid formed by dispersing cobalt in toluene is used. Such magnetic powder is an ultrafine particle powder ranging from 0.01 μm to 0.02 μm and moves under Brownian motion that is one of the specific characteristics of ultrafine particles. In addition, the magnetic fluid is characterized in that even if an external magnetic field, gravity, centrifugal force, etc. is applied thereto, the density of magnetic powder particles in the fluid remains constant.

The yoke 550 makes the formation of the magnetic flux of the magnet assembly 510 smooth and forms a magnetic closed circuit. The yoke 550 has a rectangular parallelepiped shape which has a space for receiving the magnet assembly 510 and the coil 390 therein and is open on the upper and lower ends thereof.

In detail, the yoke 550 includes a rectangular upper plate 560 which has an opening therein, and longitudinal side plates 570 and lateral side plates 580 which are bent downwards from the edges of the upper plate 560 and extend predetermined lengths.

Second supports 585 which are inserted into second ends of the springs 700 are provided on the outer surfaces of the lateral side plates 580 of the yoke 550. The second supports 585 are disposed at positions corresponding to the first supports 360 provided on the bracket 300. In FIG. 2, in the same manner as that of the first support 360, although each second support 585 has been illustrated as having a shape corresponding to that of the coil spring that is used as the spring 700, this is only one example given for purposes of illustration.

The magnetic field generating unit 500 having the above-mentioned construction functions to increase magnetic efficiency. The construction of the magnetic field generating unit 500 will be explained in more detail in the description of FIGS. 7 (7A and 7B) and 8 (8A and 8B). The magnetic flux of the magnetic field generating unit 500 will be explained in more detail in the description of FIG. 9.

The weight 600 functions to apply a predetermined weight to the vibration unit 400 to ensure the linear vibration of the vibration unit 400. The weight 600 is fitted over the outer surface of the yoke 550. Here, the weight 600 has an opening in the central portion thereof and is fitted over the yoke 550 in such a way as to insert the yoke 550 into the opening of the weight 600.

In detail, the weight 600 includes an upper weight plate 610 which has the opening therein, and longitudinal side plates 620 and lateral side plates 630 which are bent downwards from the edges of the upper weight plate 610 and extend predetermined lengths. Preferably, the corners of the weight 600, that is, the junctions between the longitudinal side plates 620 and the lateral side plates 630, are open such that the yoke 550 which is connected to the springs 700 is exposed to the outside through the corners of the weight 600.

The springs 700 elastically support the vibration unit 400 such that it can linearly vibrate in the horizontal direction. To elastically support the vibration unit 400, the first ends of the springs 700 are fastened to the lateral side plates 350 of the bracket 300 while the second ends thereof are fastened to the vibration unit 400.

The springs 700 are disposed on opposite sides of the vibration unit 400 at positions corresponding to each other. The first ends of the springs 700 are supported by the first supports 360 provided on the lateral side plates 350 of the bracket 300. The second ends of the springs 700 are supported by the second supports 585 provided on the lateral side plates 580 of the yoke 550 of the vibration unit 400.

For example, a coil spring or a plate spring can be used for each spring 700. In this embodiment, coil springs have been illustrated as being used as the springs 700 for the sake of description.

Figure 7A:
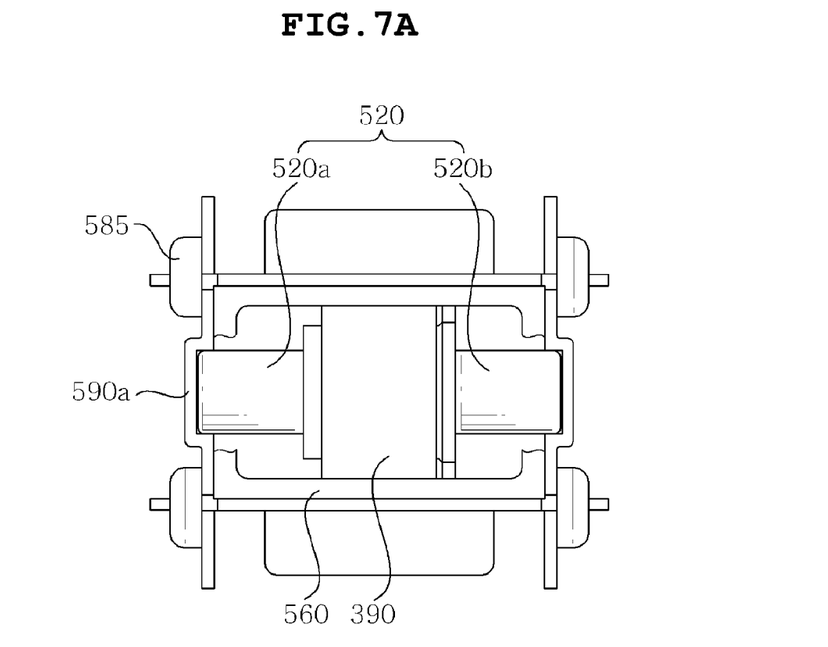
FIGS. 7A and 7B are respectively a plan view and a perspective view illustrating a magnetic field generating unit of the horizontal linear vibrator of FIG. 2.
Figure 7B:
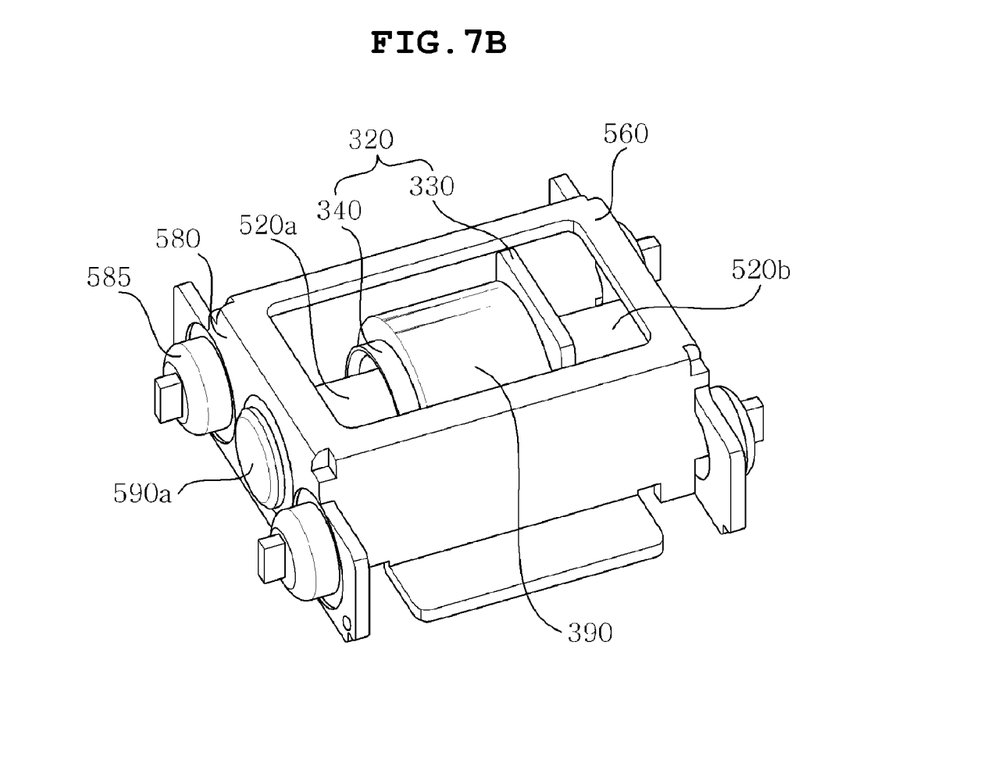
Figure 8A:
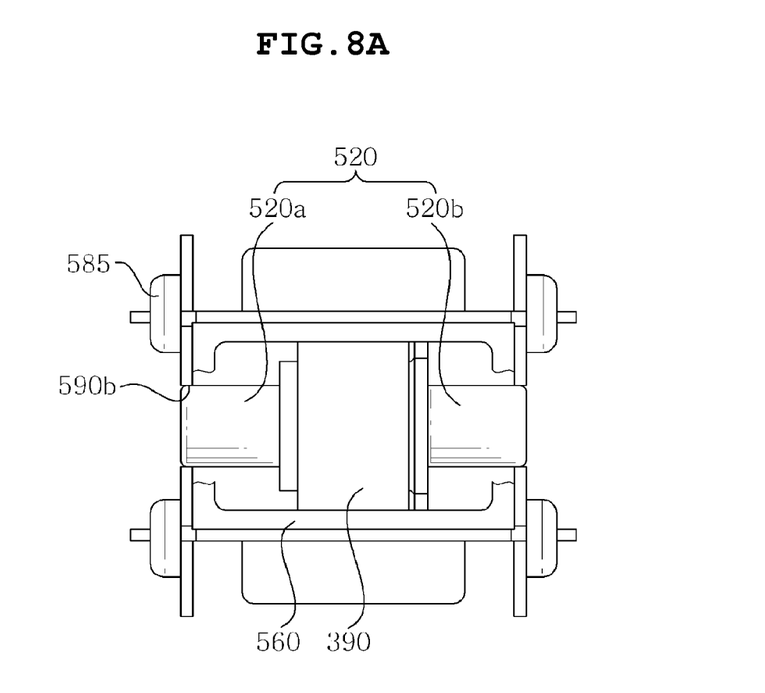
FIGS. 8A and 8B are respectively a plan view and a perspective view illustrating a magnetic field generating unit of a horizontal linear vibrator, according to another embodiment of the present invention.
Figure 8B:
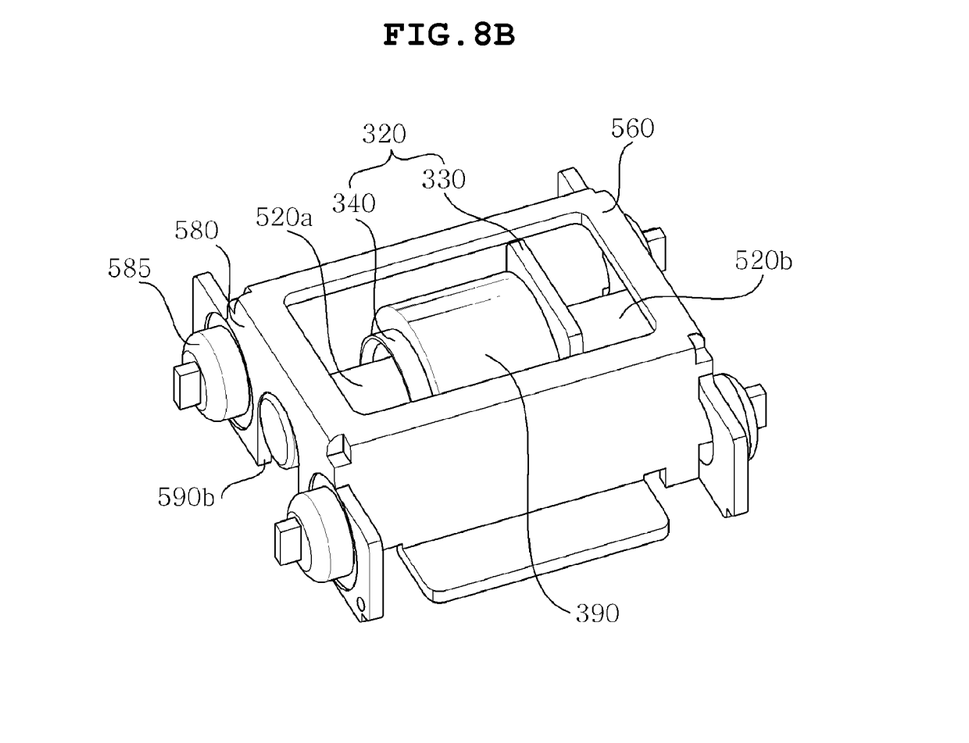

FIGS. 7A and 7B respectively are a plan view and a perspective view illustrating the magnetic field generating unit 500 of the horizontal linear vibrator of FIG. 2. FIGS. 8A and 8B respectively are a plan view and a perspective view illustrating a magnetic field generating unit 500 according to another embodiment of the present invention. Hereinafter, the structure of the magnetic field generating unit 500 will be described in detail with reference to these drawings.

In the horizontal linear vibrator 100, the weight and vibrational displacement of the vibration unit 400 can be increased by increasing the size of the horizontal area. However, if the magnet 520 and the coil 390 are increased in size, the thickness of the vibration unit 400 is also increased. As a result, it may be difficult to generate a large electromagnetic driving force.

The embodiments of the present invention propose a structure of the magnetic field generating unit 500 which can generate relatively large electromagnetic driving force without increasing the size of the magnet 520 and the coil 390.

In detail, the magnet unit 500 is configured such that the yoke 550 covers the sidewalls of the magnets 520 which are disposed on opposite sides of the magnetic body core 530 such that the similar poles thereof face each other. In other words, the magnetic field generating unit 500 has a shape in which the magnet assembly 510 crosses the to rectangular yoke 550 in the lateral direction. By virtue of this structure, magnetic flux is focused on portions at which it is linked with the coil 390, so that a large electromagnetic driving force can be generated.

The yoke 550 has a space for containing the magnet assembly 510 and the coil 390 therein and surrounds the sidewall of the magnet assembly 510. The longitudinal side plates 570 of the yoke 550 are spaced apart from each other by a predetermined distance such that the longitudinal side plates 570 are adjacent to the coil 390. The lateral side plates 580 of the yoke 550 are spaced apart from each other by a predetermined distance such that the lateral side plates 580 are adjacent to the ends of the magnets 520.

Here, the lateral side plates 580 of the yoke 550 may have sizes appropriate for them to be in contact with and thus support the ends of the magnets 520. Preferably, the lateral side plates 580 of the yoke 550 have a configuration appropriate to facilitate the assembly of the magnets 520 with the yoke 550 and prevent the magnets 520 from becoming removed from the yoke 550 when the vibration unit 400 linearly vibrates.

For example, as shown in FIGS. 7A and 7B, the yoke 550 may be configured such that a bent depressed portion 590a is formed in the inner surface of each lateral side plate 580 of the yoke 550 and the ends of the magnets 520 are respectively inserted into the bent depressed portions 590a. Due to this configuration in which the yoke 550 has the bent depressed portions 590a, the magnets 520 can be prevented from undesirably becoming removed from the yoke 550.

Alternatively, as shown in FIGS. 8A and 8B, the yoke 550 may be configured such that notches 590b are formed in the lateral side plates 580 of the yoke 550 and the ends of the magnets 520 are respectively inserted into the notches 590b. Here, the notches 590b have shapes corresponding to that of the magnets 520. For the sake of the assembly of the yoke 550, it is preferable that each notch 590b open downwards. The ends of the magnets 520 that are exposed through the notches 590b are covered with the weight 600. Although the end surfaces of the portions of the magnets 520 that are exposed through the notches 590b are not completely covered with the yoke 550, because the lateral side plates 580 of the yoke 550 are disposed adjacent to the end surfaces of the magnets 520, magnetic flux generated from the magnets 520 is formed along the yoke 550, as shown in FIG. 9.

Figure 9:
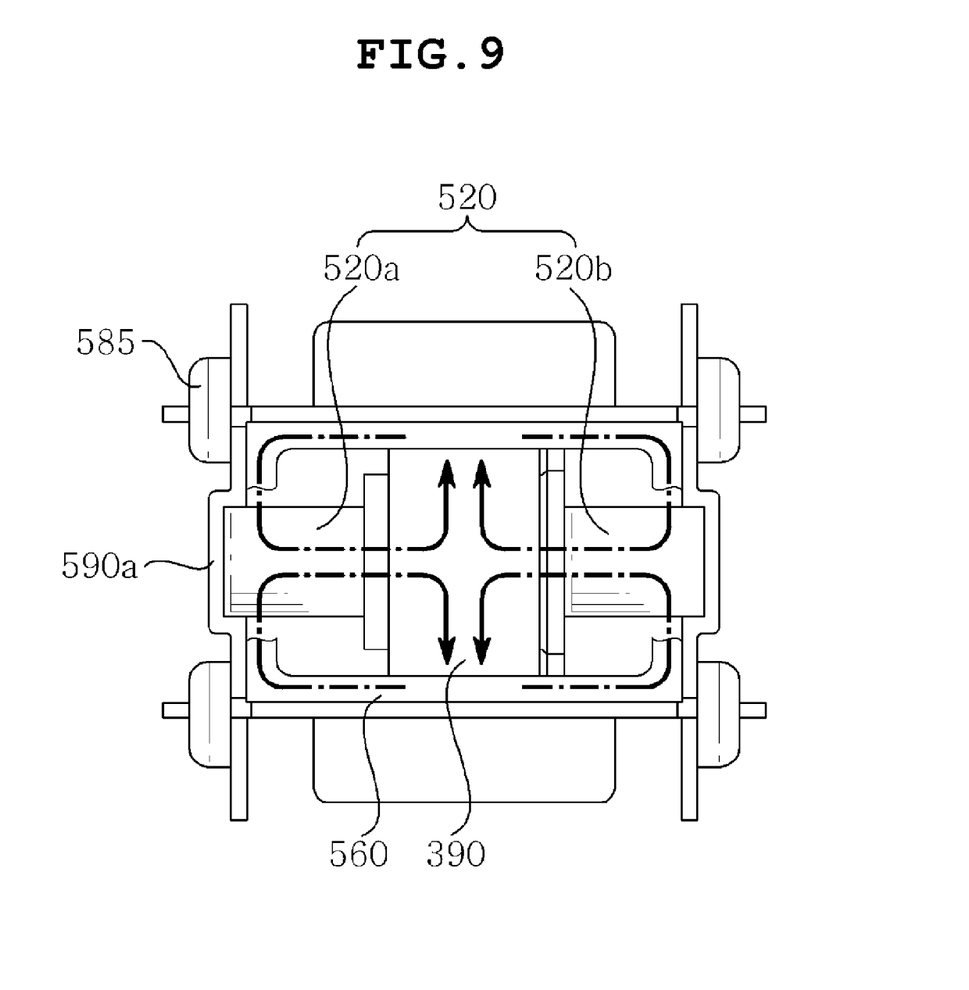
FIG. 9 is a view illustrating the flow of the magnetic flux of the magnetic field generating unit according to the present invention.

FIG. 9 is a view illustrating the flow of the magnetic flux of the magnetic field generating unit according to the present invention. The magnetic flux of the magnetic field generating unit will be explained in detail with reference to FIG. 9.

Referring to FIG. 9, because the magnets 520 are disposed on opposite sides of the magnetic body core 530 such that the like poles thereof face each other, the magnetic flux of the magnets 520 flows from the magnetic body core 530 towards the longitudinal side plates 570 of the yoke 550 that covers the magnet assembly 510, as shown by the arrows of FIG. 9. Here, magnetic flux which flows towards the longitudinal side plates 570 of the yoke 550 is focused on a portion around the magnetic body core 530, that is, on a portion at which it is lined with the coil 390. Hence, when volume and the current consumption are the same, the present invention can generate a larger electromagnetic force compared to the conventional art. Due to this, the displacement of the vibration unit 400 is increased, thus enhancing the vibrational force.

Here, the yoke 550 that surrounds the magnet assembly 510 forms the closed magnetic circuit which forms the flow of the magnetic flux shown in FIG. 9. Thus, the magnetic attractive force of the magnets 520 to the casing 20 and/or the bracket 300 is minimized As a result, the vibration unit 400 can be prevented from being biased to one side by the magnetic attractive force.

As described above, in a horizontal linear vibrator according to the present invention, a vibration unit vibrates in the horizontal direction. Therefore, the present invention does not require space for vertical motion displacement of the vibration unit, thus reducing the thickness of the horizontal linear vibrator.

Furthermore, the present invention is designed such that the horizontal linear vibrator extends a predetermined length in the horizontal direction which is the direction in which the vibration unit vibrates. Hence, sufficient vibrational displacement of the vibration unit can be ensured in the horizontal direction, thus increasing the quantity of vibration.

In addition, magnets are oriented such that their similar poles face each other, and a yoke surrounds the sidewalls of the magnets. Thus, the magnetic flux which is linked with a coil is increased, thus enhancing the electromagnetic driving force. Because magnetic force of the magnets which affects the bracket and/or casing can be minimized, the vibration unit can be prevented from being undesirably biased to one side.

Although the embodiments of the present invention have been disclosed for illustrative purposes, it will be appreciated that a horizontal linear vibrator according to the invention is not limited thereby, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A horizontal linear vibrator, comprising:

a casing;

a bracket assembled with the casing to form an internal space in the casing and the bracket, with a coil provided above the bracket such that a center axis of the coil is oriented in a horizontal vibration direction;

a vibration unit disposed through the coil, the vibration unit comprising: a magnetic field generating unit having a magnet assembly and a yoke, the magnet assembly having a magnetic body core and magnets provided on opposite sides of the magnetic body core such that like poles of the magnets face each other, the yoke surrounding sidewalls of the magnets and the coil; and a weight mounted to the magnetic field generating unit; and a spring coupled to a sidewall of the casing or the bracket, the spring elastically supporting the vibration unit to allow the vibration unit to vibrate in the horizontal direction.

2. The horizontal linear vibrator as set forth in claim 1, further comprising:

a damper provided on the sidewall of the casing or the bracket to prevent the vibration unit from coming into direct contact with the casing or the bracket.

3. The horizontal linear vibrator as set forth in claim 1, further comprising:

a circuit board installed on the bracket, the circuit board being connected to an external input terminal.

4. The horizontal linear vibrator as set forth in claim 1, further comprising:

a bobbin provided on the bracket, the bobbin being inserted into the coil.

5. The horizontal linear vibrator as set forth in claim 4, wherein the bobbin comprises:

a vertical plate perpendicularly provided on the bracket; and a horizontal extension part extending a predetermined length from the vertical plate in the horizontal vibration direction.

6. The horizontal linear vibrator as set forth in claim 1, wherein a magnetic fluid is applied to an outer surface of the magnet assembly.

7. The horizontal linear vibrator as set forth in claim 1, wherein the yoke is open on upper and lower ends thereof.

8. The horizontal linear vibrator as set forth in claim 1, wherein the yoke comprises:

an upper plate having an opening therein, the upper plate having a rectangular shape; and longitudinal side plates and lateral side plates bent from the upper plate downwards and extending predetermined lengths.

9. The horizontal linear vibrator as set forth in claim 8, wherein a spring support is provided on an outer surface of the lateral side plates of the yoke, so that the spring is supported by the spring support.

10. The horizontal linear vibrator as set forth in claim 8, wherein the lateral side plates of the yoke has a bent depressed portion therein, so that an end of the corresponding magnet is inserted into and supported by the bent depressed portion.

11. The horizontal linear vibrator as set forth in claim 8, wherein the lateral side plates of the yoke has a notch therein, so that an end of the corresponding magnet is inserted into the notch.

12. The horizontal linear vibrator as set forth in claim 1, wherein the spring comprises a coil spring or a plate spring.

13. The horizontal linear vibrator as set forth in claim 1, wherein the spring comprises a plurality of springs provided on opposite sides of the vibration unit.

* * * * *